United States Patent
Smith et al.

[11] Patent Number: 5,374,094
[45] Date of Patent: Dec. 20, 1994

[54] RECREATIONAL VEHICLE WITH TELESCOPIC ELEVATOR SHAFT AND FLOATING SECOND FLOOR

[76] Inventors: Raymond A. Smith; Hilde W. Smith, both of 7316 Bear Ridge Rd., North Tonawanda, N.Y. 14120

[21] Appl. No.: 31,267

[22] Filed: Mar. 15, 1993

[51] Int. Cl.5 ............................................ B60P 3/34
[52] U.S. Cl. ......................................... 296/26; 296/165; 296/171; 296/173; 187/226
[58] Field of Search ................. 296/26, 27, 165, 171, 296/172, 173, 175, 176; 187/9 E

[56] References Cited

U.S. PATENT DOCUMENTS

| | | | |
|---|---|---|---|
| 3,323,778 | 6/1967 | Baker | 296/171 X |
| 3,363,932 | 1/1968 | Mann | 296/26 X |
| 3,560,043 | 2/1971 | Harter | 296/27 |
| 3,608,954 | 9/1971 | Lynd | 296/26 X |
| 3,612,589 | 10/1971 | Locher, Jr. | 296/171 X |
| 3,809,426 | 5/1974 | Ratcliff | 296/27 |
| 3,850,470 | 11/1974 | Trelle | 296/27 X |
| 4,013,938 | 8/1978 | Parent | 296/26 X |

Primary Examiner—Joseph Pape
Attorney, Agent, or Firm—Robert J. Bird

[57] ABSTRACT

A recreational vehicle includes a lower body and a vertically telescoping upper body. The upper body includes a second floor, fully suspended when the upper body is raised, and resting on stops when the upper body is lowered. A lift mechanism includes a take up drum, lift line, and pulley system to raise and lower the upper body including the upper portion of the telescopic elevator shaft while telescoping corner posts support and guide its motion. A elevator has bottom and top floors connected by vertical columns and a lift cable extending from the base of each column through top and bottom pulleys of an adjacent corner post to a power take up drum to raise and lower the elevator. A vertically movable bathroom is similarly provided.

7 Claims, 11 Drawing Sheets

RECREATIONAL VEHICLE WITH TELESCOPIC ELEVATOR SHAFT AND FLOATING SECOND FLOOR

FIELD OF THE INVENTION

This invention relates to recreational vehicles and more particularly to a two-story vehicle with provision for raising and lowering a second floor for expanded living space and a telescoping elevator shaft.

BACKGROUND INFORMATION

Recreational vehicles which telescope upward to provide a second floor are known in the prior art. The following United States Patents are the most relevant prior art that I know of:

| | |
|---|---|
| U.S. Pat. No. 2,862,253 to Place et al; | U.S. Pat. No. 2,538,736 to Spencer; |
| U.S. Pat. No. 2,193,352 to Thomas; | U.S. Pat. No. 3,542,415 to Ratcliff; |
| U.S. Pat. No. Des. 208,695 to Bouchard; | U.S. Pat. No. Des. 219,510 to Tofani |

Each of these earlier patents discloses a trailer including a lower story with floor and roof, and a slightly larger upper story, with no floor, placed over the lower story. In the expanded or raised configuration, the roof of the lower story becomes the floor of the upper story. In the collapsed configuration, the upper story slides down over the walls and roof of the lower story. Lowering the upper story to roadable height reduces its volume to substantially zero, requiring that furniture and other contents be removed before lowering.

it is an object of this invention to provide a roadable two-story recreational vehicle when accommodates the furniture on both floors.

SUMMARY OF THE INVENTION

The present invention allows a two-story recreational vehicle to be manufactured with two flat floors in the living mode, in addition to multiple level floors in the travel mode to suit furniture heights. This is accomplished by a set of floating second floors which are fully cable suspended from the roof of the vehicle, but rest on furniture or stops when lowered.

Accessibility of the second floor is obtained by means of an elevator cage which travels within a telescoping elevator shaft assembly. The elevator cage has bottom and top floors connected by five corner posts. The bottom and top floors of the cage have the same spacing as the two vehicle floors in the living mode to allow cross passage on either floor whether the elevator is up or down. A set of lift cables, connected to a power take-up spool under the floor of the elevator shaft and guided over take-up pulleys within the shaft walls, activate the elevator. The take-up pulleys are coaxially mounted on a drive shaft and controlled by a brake/clutch assembly.

A bathroom is constructed as a second elevator car with similar controls.

DESCRIPTION

Figure 1:
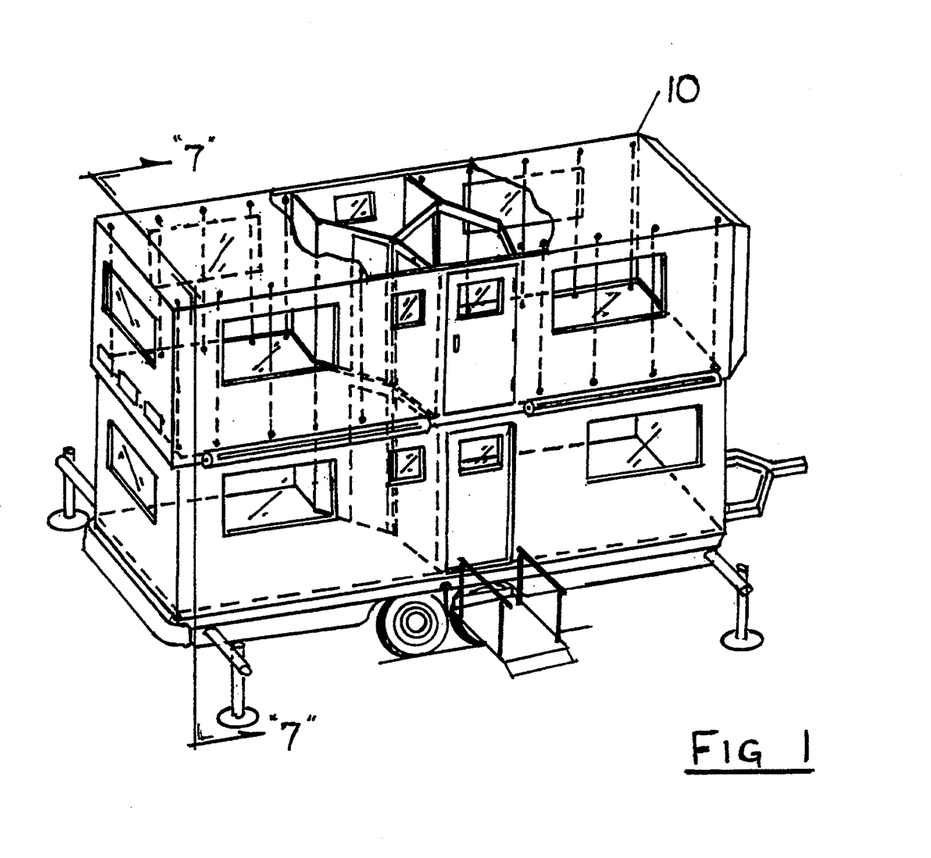
FIG. 1-6 are three-dimensional views of three different classes of recreational vehicles with expanded living space according to my invention.
Figure 2:
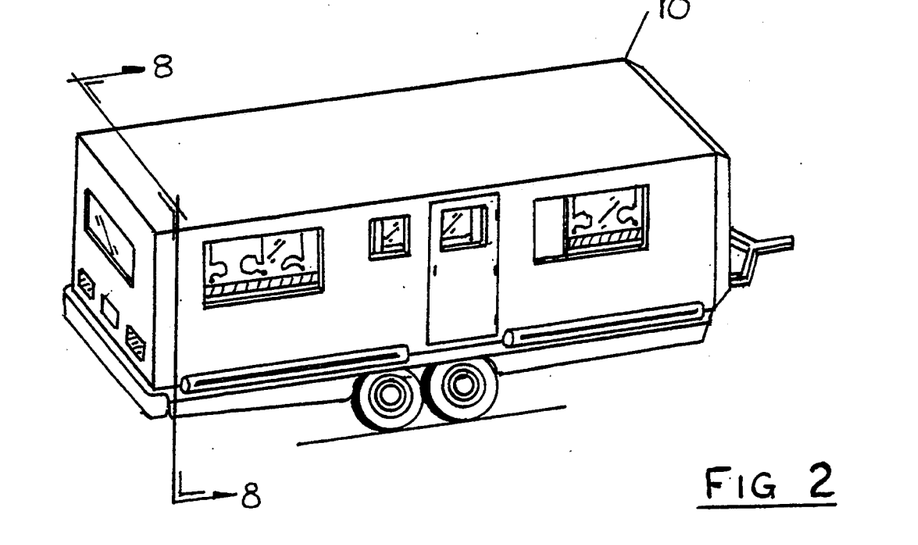
Figure 3:
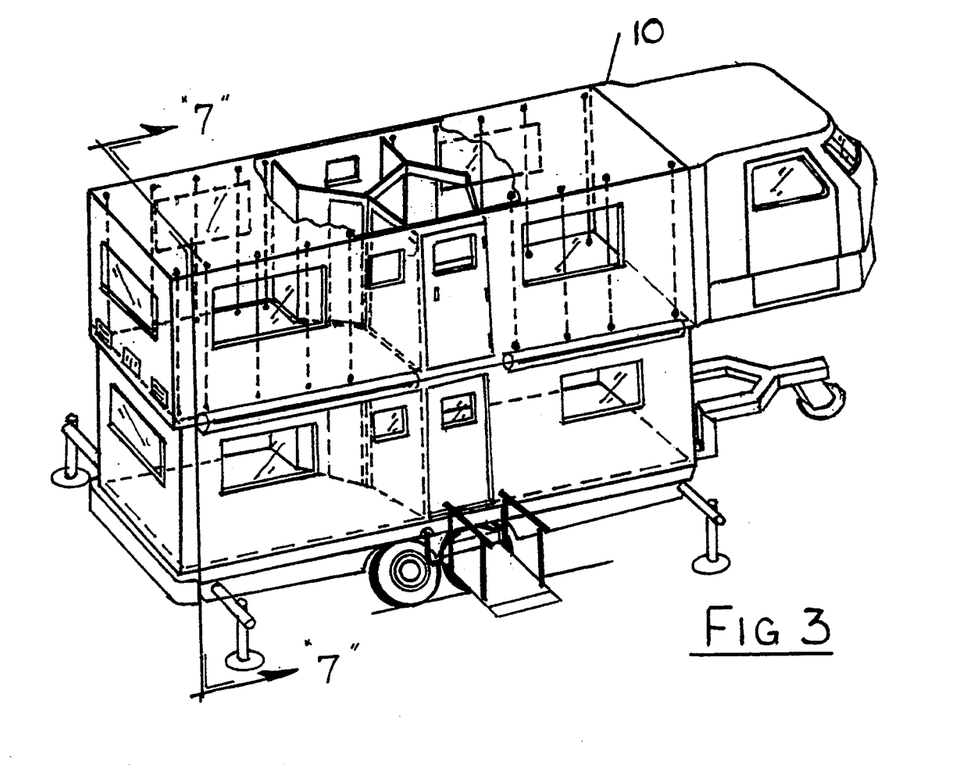
Figure 4:
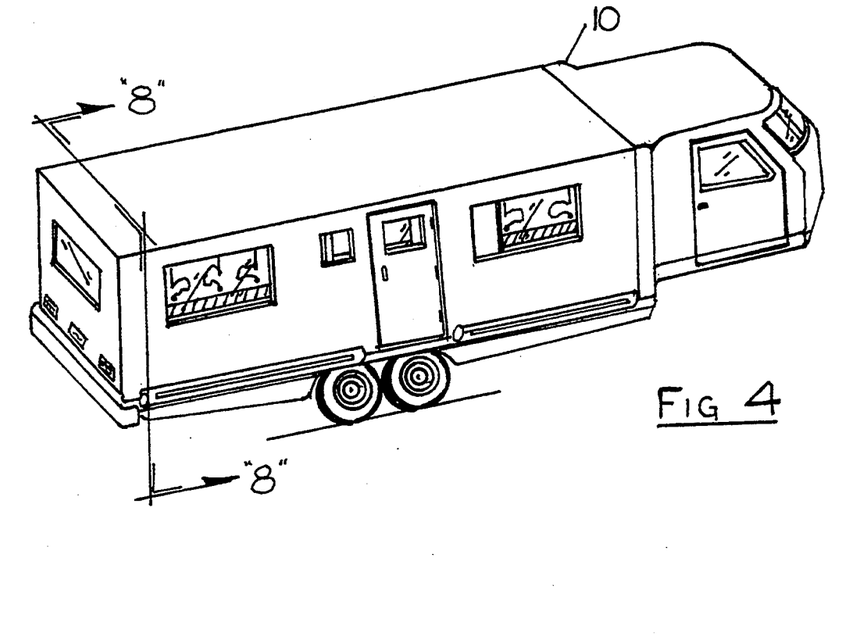
Figure 5:
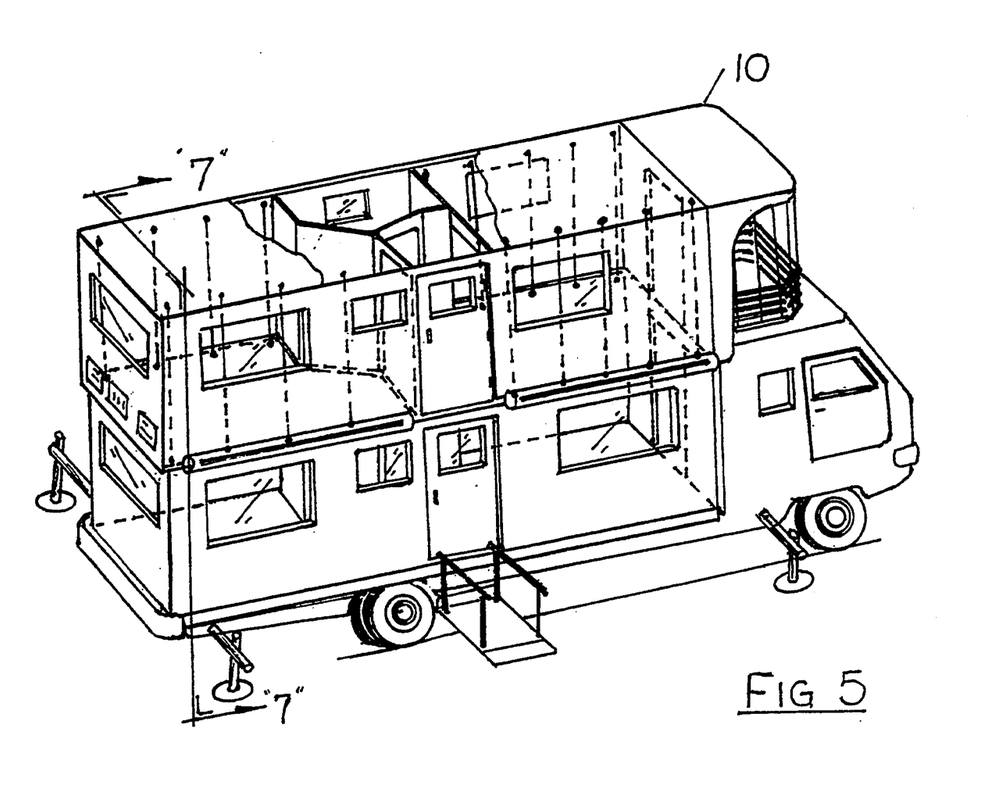
Figure 6:
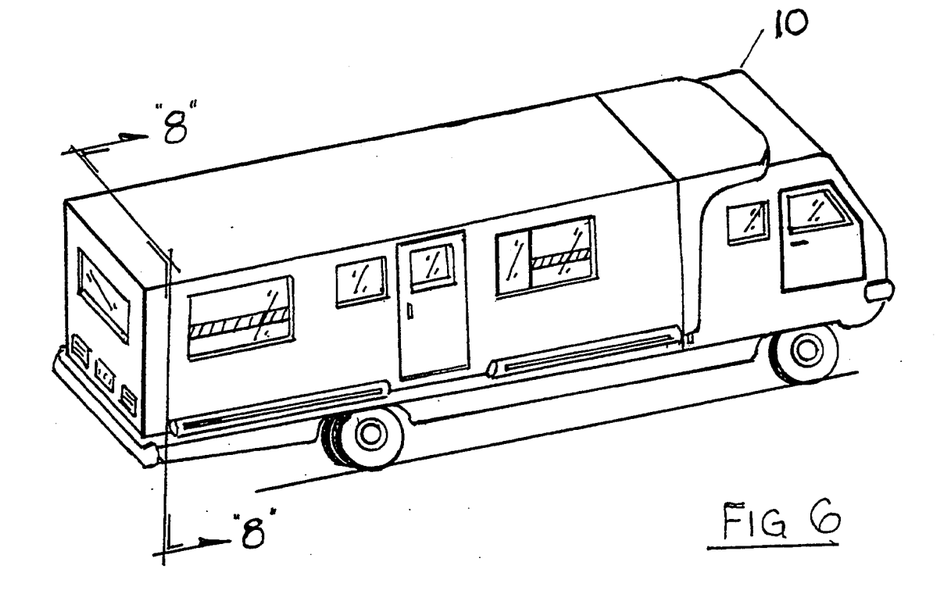

FIGS. 1 and 2 show a conventional recreational vehicle. FIGS. 3 and 4 show a 5th wheel recreational vehicle. FIGS. 5 and 6 show a class A recreational vehicle, or motor home. The invention is applicable equally to all of these vehicles, and do the following description will be confined to the travel trailer 10 of FIGS. 1 and 2. The roof of the travel trailer 10 is partially broken away to reveal inner detail.

Figure 7:
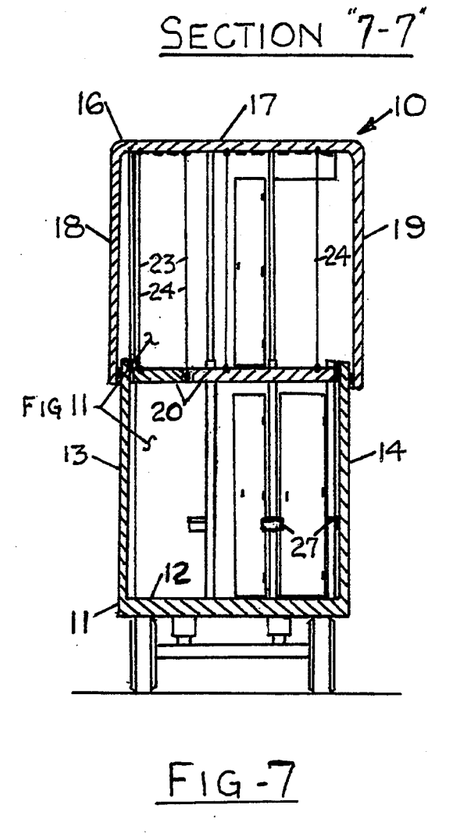
FIGS. 7 and 8 are sectional views on the plane A—A of FIG. 5, showing the upper body in raised position and lowered positions, respectively.
Figure 8:
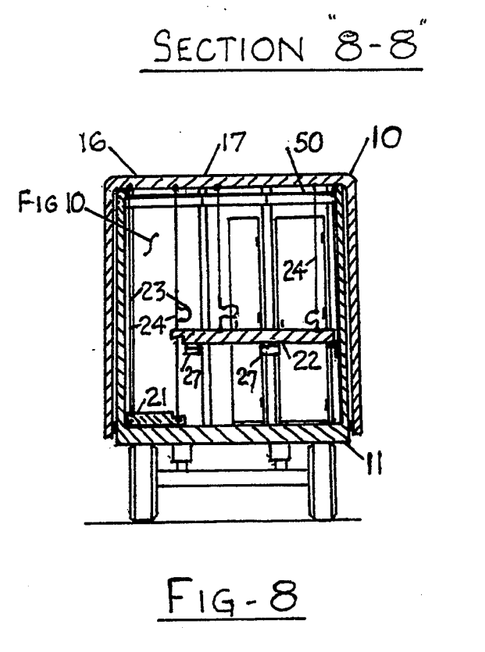

Referring now to FIGS. 7 and 8, the two-story recreational vehicle 10 includes a lower body 11 and an upper body 16. The lower body 11 includes a lower floor 12, sidewalls 13 and 14, and an open top. The upper body 16 includes a roof 17 and descending sidewalls 18 and 19 immediately outside the sidewalls 13 and 14 of the lower body. The upper body 16 further includes an upper floor 20 which is suspended from the roof 17 on suspension cables 23. The upper floor 20 may or may not include separate sections 21 and 22 independently suspended from the roof 17 on cables 23.

When the upper body 16 is raised as shown in FIG. 7, the upper floor sections 21 and 22 are fully suspended at the desired second floor level, engaging each other with mating tongue and groove edges to form a rigid and stable second floor.

When the upper body 16 is lowered for travel, as shown in FIG. 8, the upper floor sections 21 and 22 rest on furniture, or on stops 26 mounted at desired levels on the inner sidewalls 13 and 14 of the lower body 11.

Figure 9:
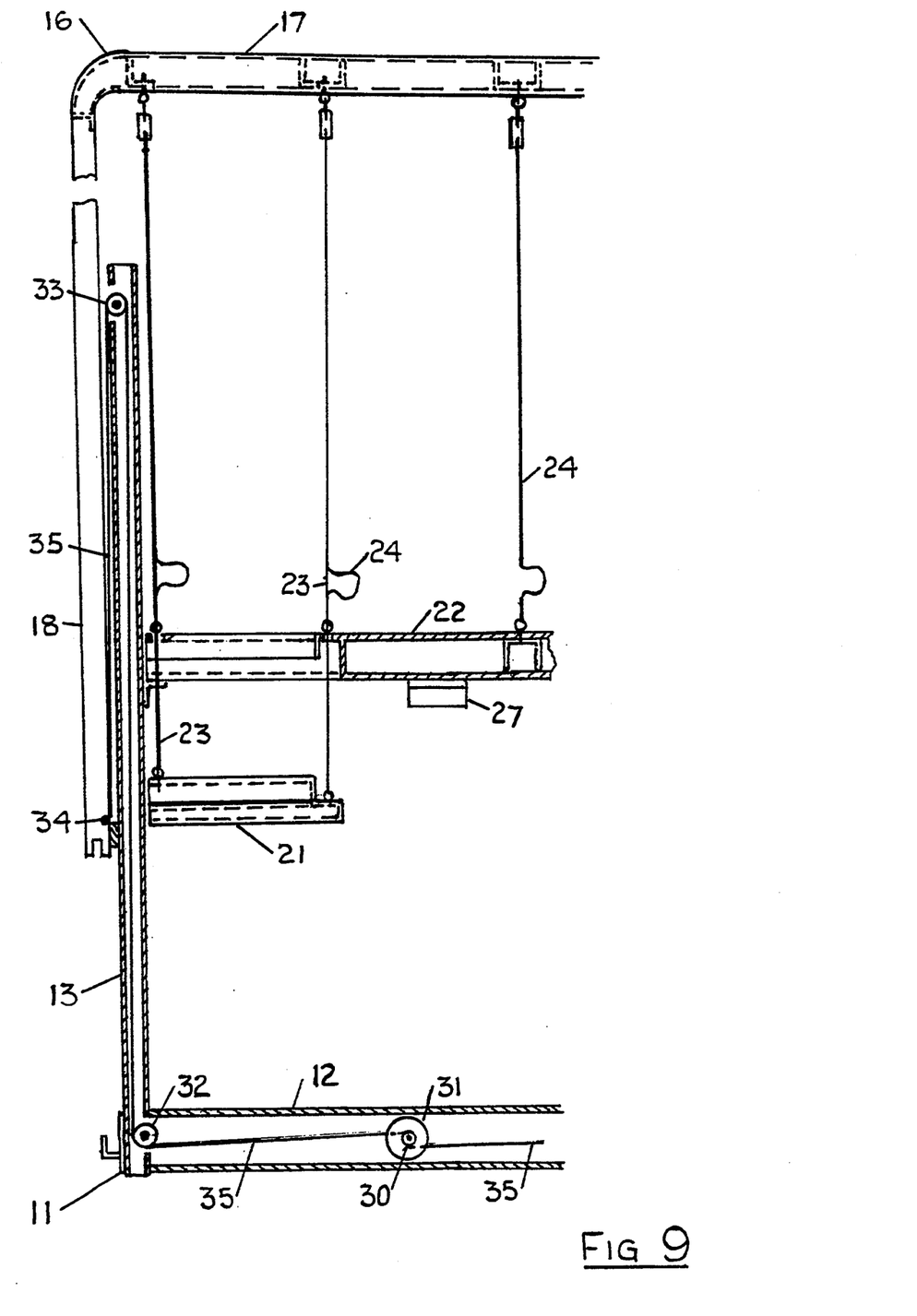
FIG. 9 is an enlarged view of the lift mechanism of FIGS. 7 and 8, in a position between fully raised (FIG. 7) and fully lowered (FIG. 8).

Referring now to FIG. 9 the sidewall 18 of the upper body 16 is shown in vertically sliding engagement with the sidewall 13 of the lower body 11. The upper body 16 is shown at an intermediate elevation relative to the lower body 11. At this point, the floor section 22 is at rest on the stops 27 and its supporting cables 24 are limp, and the floor section 21 is suspended on its cables 23 at a distance above the stops 26.

A lift mechanism in FIG. 9 includes a line shaft 30 and an integral take-up drum 31 mounted in or under the floor 12, a first strap pulley 32 at the base of the sidewall 13, a second strap pulley 33 at the top if the sidewall 13, and an anchor bolt or fastener 34 near the bottom of the sidewall 18. A cargo strap 35 extends from the spool 31, around the pulleys 32 and 33, and is fastened to the anchor bolt 34. The line shaft 30 is operatively connected to a lift motor, not shown, to raise the upper body 16 with its floor sections 21, 22 for use as in FIG. 7, and to lower the body 16 and floor sections 21, 22 for travel as in FIG. 8. Guide rollers stabilize the floor members relative to the sidewalls.

Suspension of the top floor 20 permits the furnishings on both top and bottom floors to remain in place when the upper body 16 is lowered for travel. This is a substantial departure from the prior art, in which the floor of the second story is fixed and the roof lowers upon it, thus requiring the removal of items from the second floor.

The configuration of the floor sections 21 and 22, and the placement of the corresponding stops 26 and 27, permit selective placement of cabinetry, appliances, furnishings, and the like on the bottom floor 12 and on sections 21, 22 of the top floor. To maximize the use of available space, taller items on the first floor might be placed under the higher second floor section 22, and shorter items placed under the lower section 21. Conversely, taller items on the second floor might be placed on section 21 and shorter items on section 22. See FIG. 8.

Figure 10:
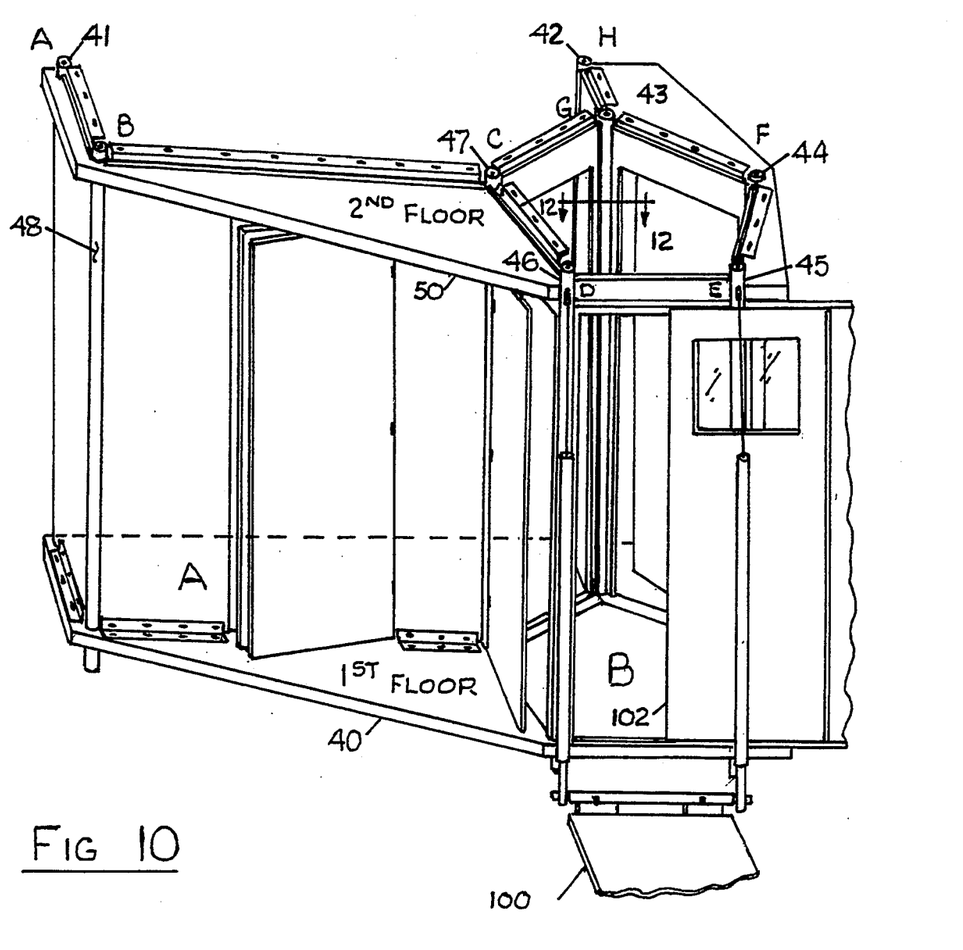
FIGS. 10 and 11 are three-dimensional views of the telescopic elevator shafts.
Figure 11:
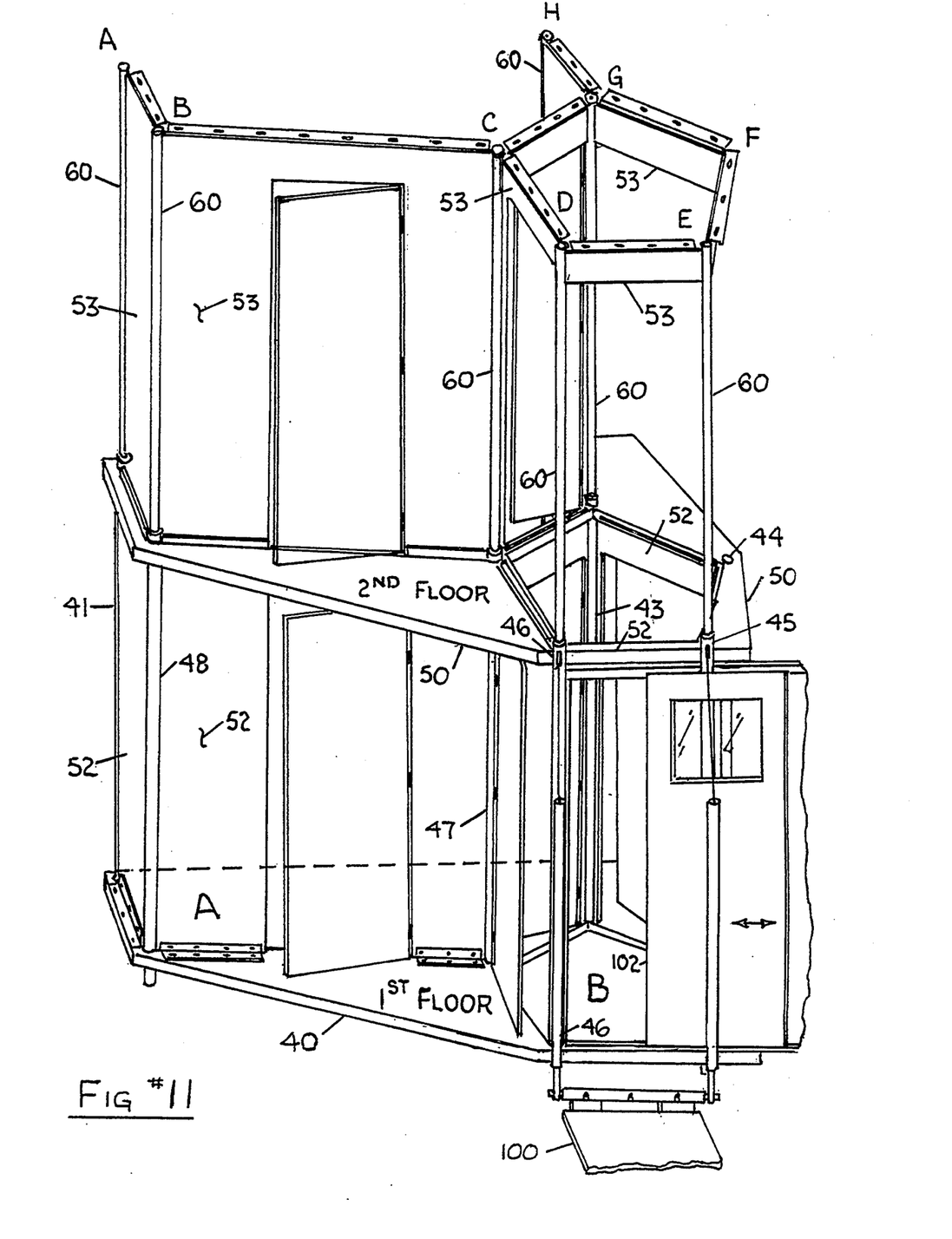

FIGS. 10-14 relate to that part of the vehicle of FIGS. 1, 3, 5 under the broken away roof. FIG. 10 shows a first story floor section 40 and a second story floor 50 above it. A number of corner posts 41-48 extend between the first floor 40 and the second floor 50, supporting multipanel vertical walls between them. Corner posts 41, 42, 43, 47, 48, and the walls between them, define a bathroom shaft (area A). Corner posts 43, 44, 45, 46, 47, and the walls between them, define an elevator shaft (area B). FIG. 11 shows the corner posts 41-48 and the several walls telescoped upward to form second story shaft areas A and B above the corresponding first floor areas.

Figure 12:
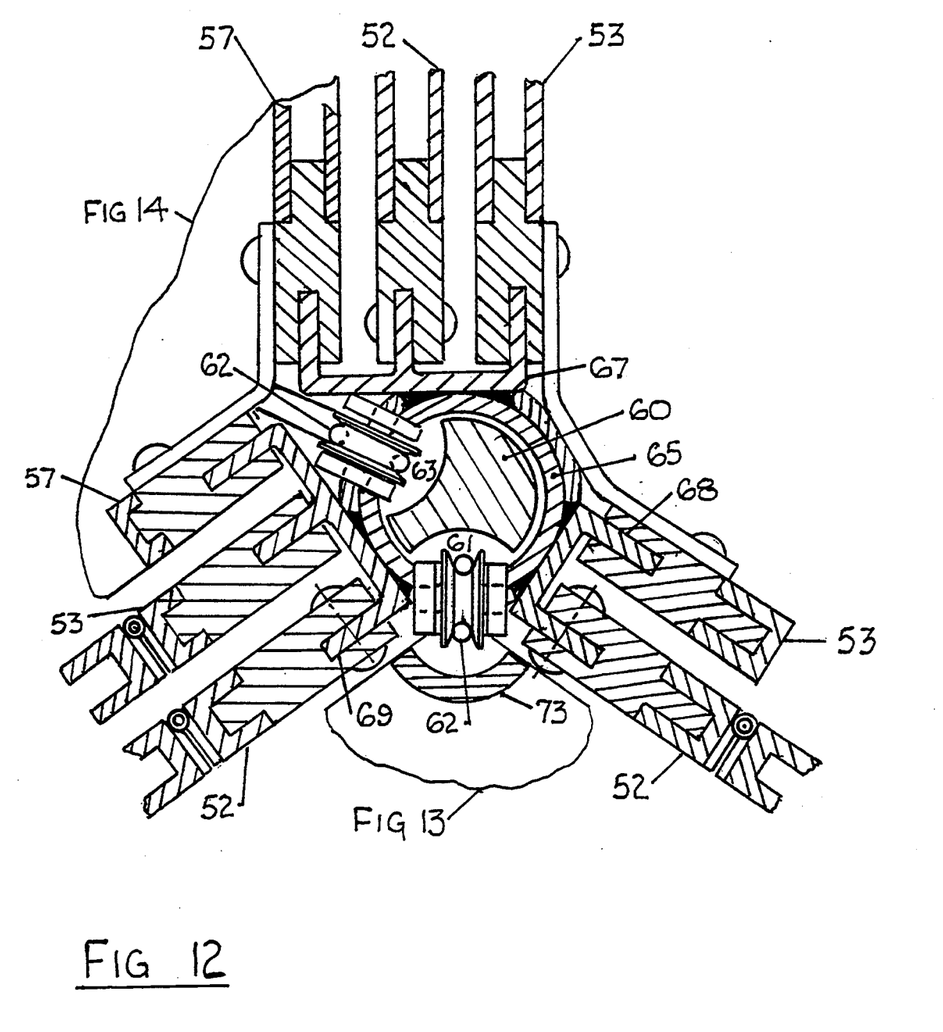
FIG. 12 is an enlarged sectional view on the plane 12—12 of FIG. 11.

FIG. 12 is an enlarged section on the plane 12—12 of FIG. 10, showing the corner post 43 and wall panels 52, 53, 57 extending radially from it. The other corner posts are similar. The corner post 43 includes a central shaft 60, with cable clearance grooves along its length, surrounded by a pipe 65. The pipe 65 supports pulleys 62, at the top and bottom ends of the pipe 65. The pulleys 62 on each post are vertically aligned with the clearance grooves in the central shaft 60. The corner post 43 also includes panel bracket 67, 68, 69 welded on the pipe 65 to anchor the several wall panels 52, 53, 57.

The elevator shaft includes fixed "first story" panels 52 and sliding "second story" panels 53 vertically movable within the panel bracket 67, 68, 69. Wall 57 is the bathroom elevator assembly (FIG. 14) and column 73 is part of the elevator cage (FIG. 13).

Figure 13:
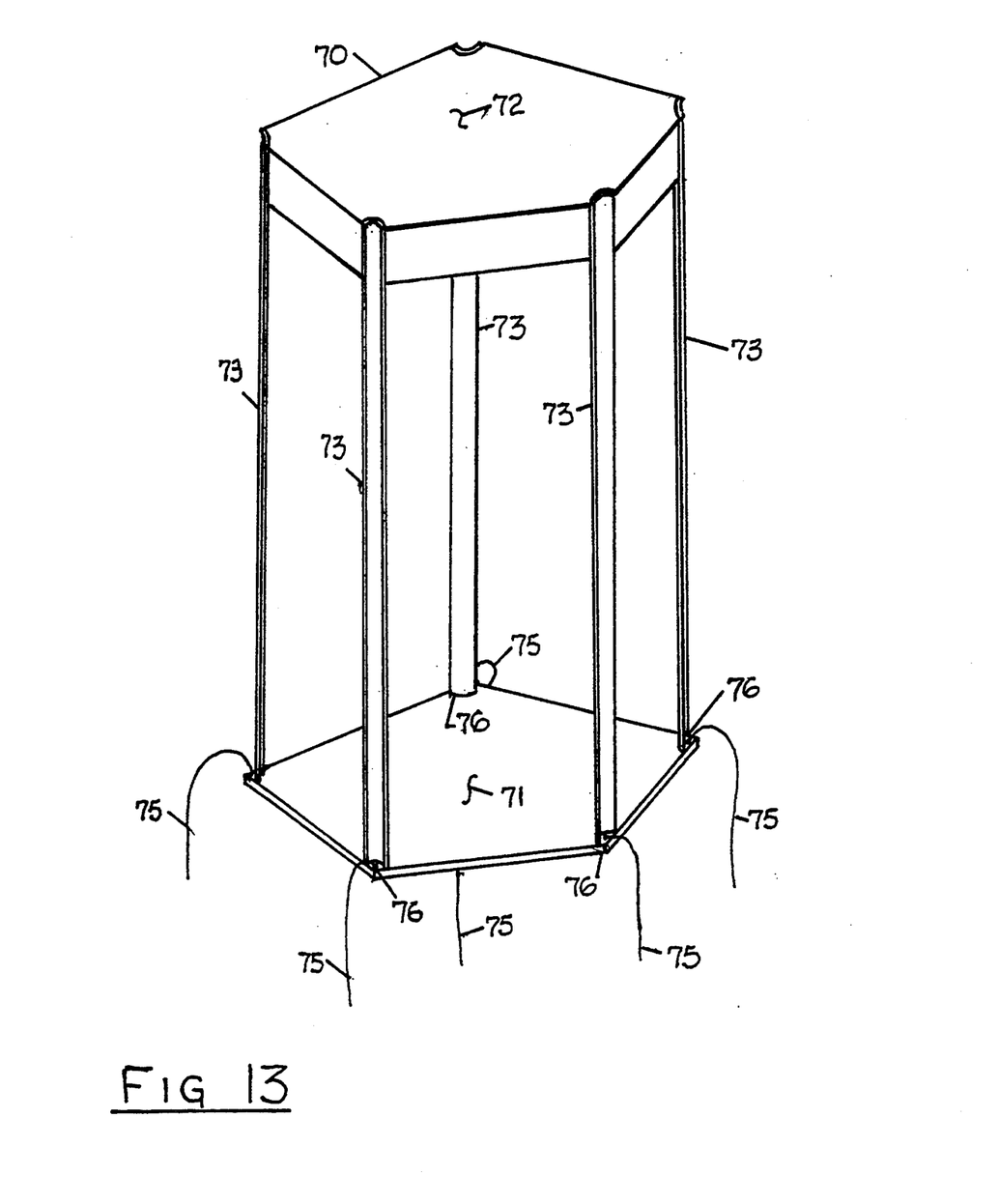
FIG. 13 is a three dimensional view of an elevator cage.
Figure 15:
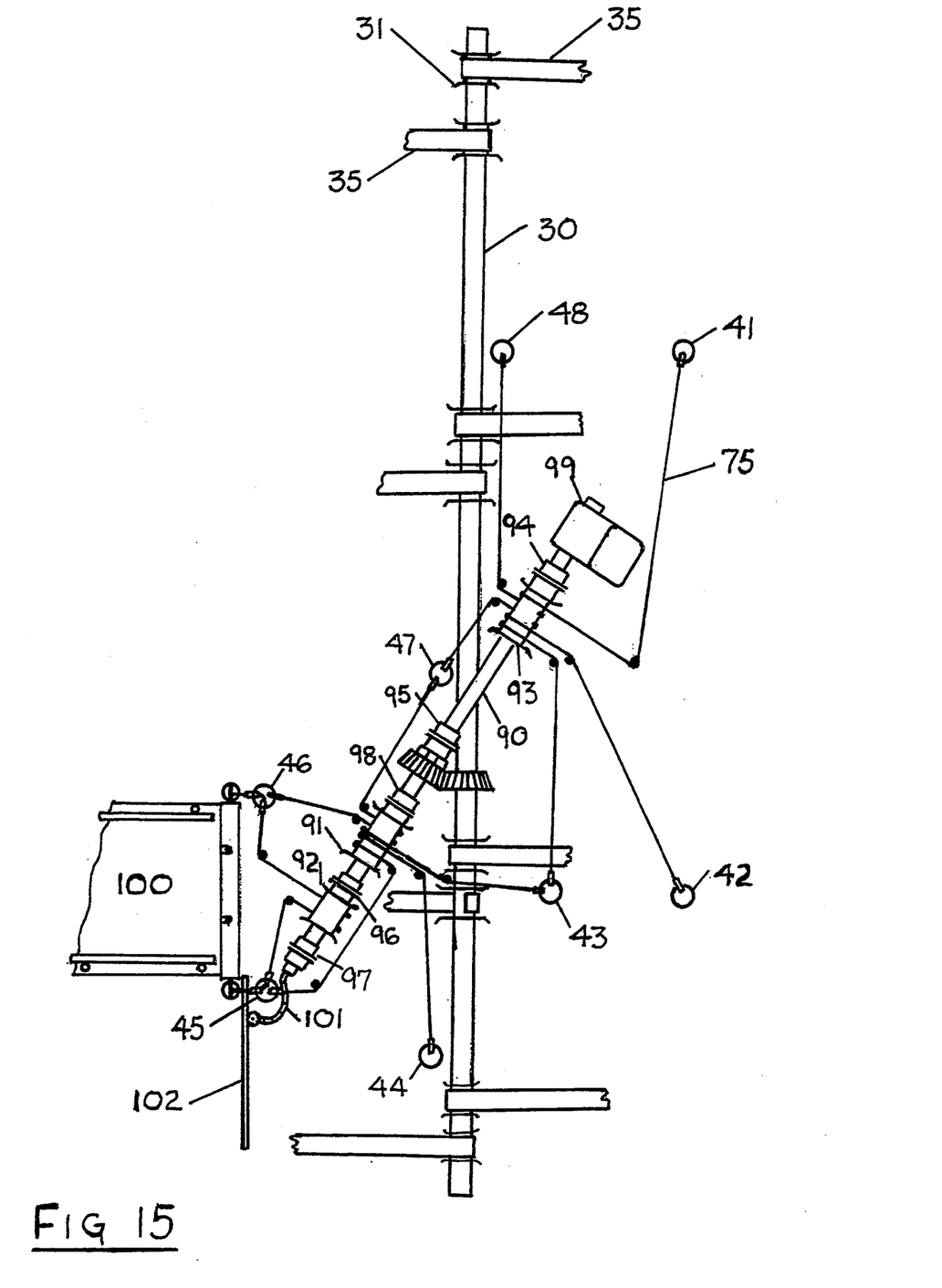
FIG. 15 is a schematic diagram of a drive system for the structures of FIGS. 1-14.

FIG. 13 shows an elevator cage 70, including a bottom floor 71 and top floor 72 connected by vertical columns 73 at their respective corners. The columns 73 are shaped to protect the lift cables 75 which extend upward from anchor points 76 at the base of each column. Cable 75 extends up from its anchor point 76, over the top pulley 62 (FIG. 12), down along the inside of pipe 65, and under the corresponding bottom pulley 62 to a take up drum 91 on the drive shaft 90 (FIG. 15). The other lift cables 75 all follow similar paths. Each extends up from its anchor 76, over a top pulley of its adjacent corner posts (44, 45, 46, 47), down the inside of its pipe 65, and under a bottom pulley 62 to the same take up drum 91 on the drive shaft 90 for raising and lowering the elevator.

Figure 14:
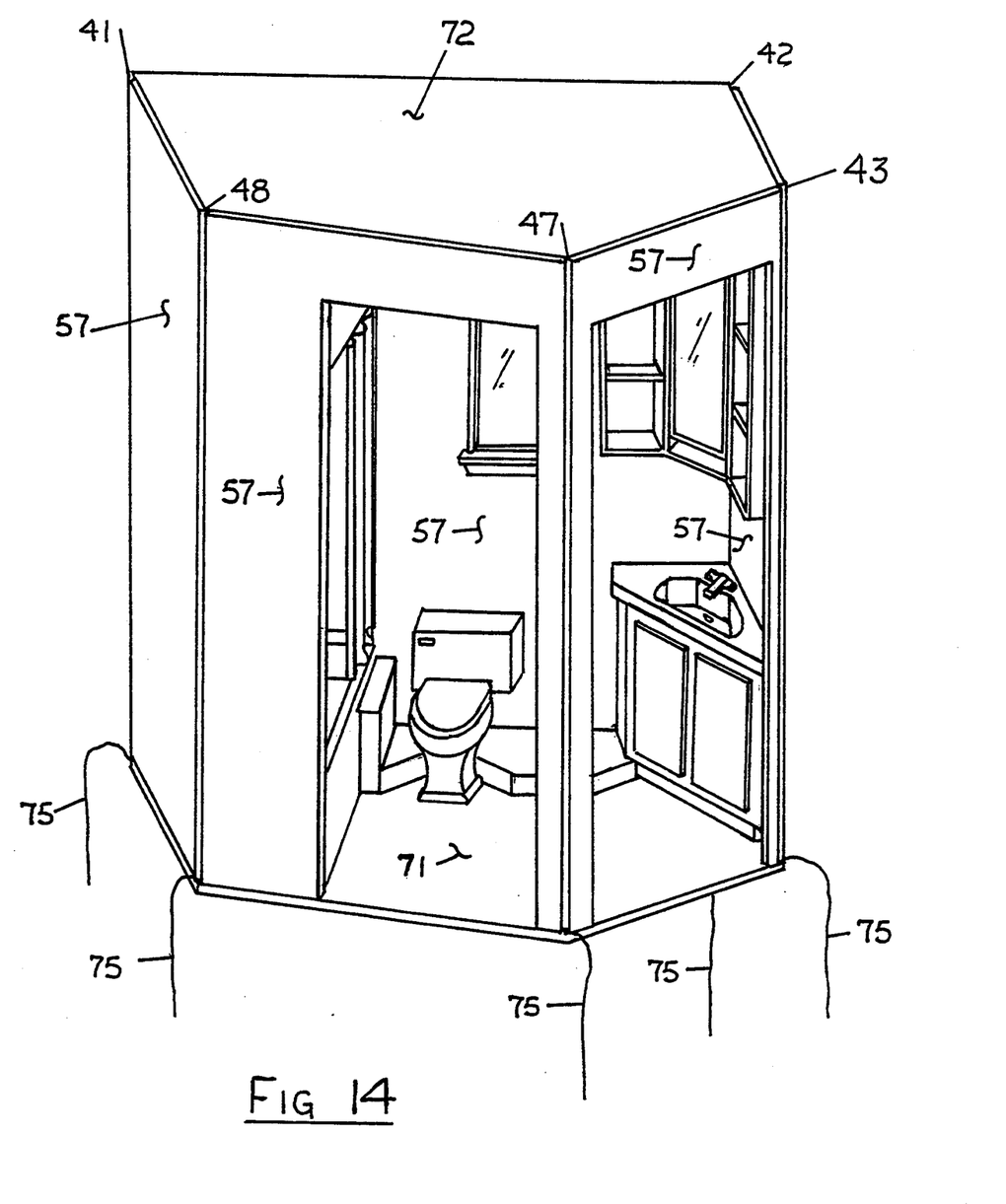
FIG. 14 is a three-dimensional view of a bathroom built into the elevator of FIGS. 10 and 11.

FIG. 14 shows a bathroom 80 similarly constructed with bottom and top floors 71, 72 connected by vertical walls 57 to form a room, and lift cables 75 anchored to the bottom corners. These lift cables 75 are similarly threaded through pulleys on the corner posts 41, 42, 43, 47, 48, to the take up drum 93 on the drive shaft 90 for raising and lowering the room.

FIG. 15 is a schematic diagram of the unified power input or drive system. The drive shaft 90 is mounted for rotation under the floor of the elevator shaft assembly, connected to an electric drive motor 99. The drive shaft 90 includes take up drums 91, 92, 93 and controlling clutch/brake units 94, 95, 96, 97, 98 to connect and disconnect the take up drums 91, 92, 93 to the drive shaft 90. The line shaft 30 is mounted for rotation inside the lower floor 12. The line shaft 30 is geared to and driven by the drive shaft 90. The line shaft 30 includes take up drums 31.

The clutch/brake 95 engages the bevel gears on drive shaft 90 and line shaft 30 to raise and lower the upper body 16 and, in turn, to raise or lower the elevator shaft upper story walls 53 bolted to the vehicle roof 17. The clutch/brake 98 engages the take up drum 91 to raise and lower the elevator 70. The clutch/brake 94 engages the take up drum 93 to raise and lower the bath room 80. The clutch/brake 96 engages to raise or lower the wheel chair lift 100. The clutch/brake 97 turns a rack and pinion drive 101 to open or close a sliding entry door 102.

In this specification, the term "recreational vehicle" is intended to include class A motor homes, fifth wheel vehicles, travel trailers, and park model mobile homes. "Stop" means any method of vertical support of the floating floor in lowered or travel mode.

The foregoing description of preferred embodiments of this invention, including any dimensions, angles, or proportions, is intended as illustrative. The concept and scope of the invention are limited only by the following claims and equivalents thereof.

What is claimed is:

1. A two-story recreational vehicle including:
   a lower body with a lower floor and stationary sidewalls, a vertically movable upper body consisting of the roof, descending sidewalls and an upper floor, said upper floor being suspended by cables or chains from said roof and positioned directly above the lower floor and travelling within the lower floor's sidewalls; said upper floor being level and fully suspended when the roof is raised and adapted to rest on stops or furniture when said upper body is lowered, thereby functioning as a floating floor.

2. A two-story recreational vehicle as defined in claim 1, said upper floor comprising a plurality of independent sections, each section being suspended from said roof by cables and coming to a stop at various levels as necessitated by the lay-out of the first floor furniture when said upper body is lowered, thereby functioning as a multiple section floating floor.

3. A two-story recreational vehicle, including:
   a lower body with a lower floor and stationary sidewalls;
   a vertically movable upper body with a roof and descending sidewalls and an upper floor suspended from said roof, said upper floor being fully suspended when said upper body is raised, and adapted to rest on stops when said upper body is lowered;
   vertical corner posts extending between said lower and upper floors and supporting wall panels between them, said corner posts each including a pipe with bottom and top pulleys thereon, and a central shaft adapted to telescope upward with vertically movable wall panels; and an elevator having bottom and top floors connected by vertical columns, and a lift cable extending from the base of each said column through top and bottom pulleys of an adjacent corner post to a take up drum to raise and lower said elevator.

4. A two story recreational vehicle as defined in claim 3, further including a room having bottom and top floors connected by vertical columns, and a lift cable extending from the base of each said column through top and bottom pulleys of an adjacent corner post to a take up drum to raise and lower said room.

5. A two story recreational vehicle, including:

a lower body with a lower floor and stationary sidewalls;

a vertically movable upper body with a roof and descending sidewalls and an upper floor suspended from said roof, said upper floor being fully suspended when said upper body is raised, and adapted to rest on stops when said upper body is lowered;

a lift mechanism for said upper body, including a drive means and integral take up drum, a first pulley at the base of said stationary sidewall, a second pulley at the top of said stationary sidewall, and a lift line extending from said take up drum through said first and second pulleys to said upper body to raise and lower said upper body relative to said lower body;

vertical corner posts extending between said lower and upper floors and supporting wall panels between them, said corner posts each including a pipe with bottom and top pulleys thereon, and a central shaft adapted to telescope upward with vertically movable wall panels; and an elevator having bottom and top floors connected by vertical columns, and a lift cable extending from the base of each said column through top and bottom pulleys of an adjacent corner post to a take up drum to raise and lower said elevator.

6. A two-story recreational vehicle as defined in claim 5, further including a room having bottom and top floors connected by vertical columns, and a lift cable extending from the base of each said column through top and bottom pulleys of an adjacent corner post to a take up drum to raise and lower said room.

7. A two-story recreational vehicle as defined in claim 5, said upper floor comprising a plurality of independent sections suspended from said roof.

* * * * *